May 15, 1956 F. H. OWENS 2,745,901

TELEVISION APPARATUS AND OPTICAL SYSTEM

Filed July 11, 1951 5 Sheets-Sheet 1

INVENTOR.
FREEMAN H. OWENS
BY
Philip S. McLean
ATTORNEY

TELEVISION APPARATUS AND OPTICAL SYSTEM

Filed July 11, 1951 5 Sheets-Sheet 2

INVENTOR.
FREEMAN H. OWENS
BY
Philip S. McLean
ATTORNEY

TELEVISION APPARATUS AND OPTICAL SYSTEM

Filed July 11, 1951 5 Sheets-Sheet 3

INVENTOR.
FREEMAN H. OWENS
BY
Philip S. McGran
ATTORNEY

INVENTOR.
FREEMAN H. OWENS
BY
Philip S. McLean
ATTORNEY

TELEVISION APPARATUS AND OPTICAL SYSTEM

Filed July 11, 1951

5 Sheets-Sheet 5

INVENTOR.
FREEMAN H. OWENS
BY Philip S. McLean
ATTORNEY 2,745,901

TELEVISION APPARATUS AND OPTICAL SYSTEM

Freeman H. Owens, New York, N. Y.

Application July 11, 1951, Serial No. 236,114
1 Claim. (Cl. 178—6)

The invention here disclosed relates to the televising and telecasting of the various subjects and objects employed in the art of television.

These subjects and objects may be considered as including the so-called live action, motion pictures, cards, transparencies and other selected subjects both animate and inanimate.

Heretofore expensive studio television camera chains and projection equipment with a separate television camera chain have been used, and in some instances a separate television camera chain for each subject.

A primary, important object of this invention is to reduce the number of television camera chains and use a simplified combined apparatus to televise and project diversified subject matter onto the mosaic of a single television camera.

Another important object of the invention is to enable televising and at the same time the projection of data upon the mosaic of a single television camera.

In addition to reducing the expense of television equipment, this invention with its combined apparatus, reduces the operating personnel required to carry out the many different operations possible.

Other important objects of the invention are to accomplish all these desirable results without limiting the various effects desired and thus, for example, to create all the usual and/or special effects for television pictures, such as composite pictures, dissolves, fades, wipes, "Pans," "Tilts" and the continuous enlargement or reduction of the image, data, slides, cards or other matter, and also the projection of clocks, teletype records, writings and the like, all onto the mosaic of a single television camera.

Generally speaking, all these and other desirable objects of the invention are attained by the novel construction of the combined apparatus to support what may be termed a studio camera with a first lens to form an inverted aerial image and a second lens for re-inverting and projecting this re-inverted aerial image onto the mosaic of the television camera, with movable still projectors on opposite sides of the studio camera optical axis at an angle to the mosaic of the same television camera, and the arrangement of motion picture projectors with reflectors to project the motion pictures onto the same mosaic of the television camera, thus providing apparatus with separate optical systems for the projection of images onto the mosaic of a single television camera.

Other important objects of the invention are to provide a compound reflector system positioned in front of the studio camera lens to enable the televising of data as it is being written, the dissolving from one scene into another and other effects such as "Pans and Fades," in addition to televising objects directly in front of the studio camera lens.

Another object of the invention is to provide certain masks at or near the aerial image of the studio camera in an inverted position and to project the re-inverted aerial masked image onto the mosaic of the television camera and to position certain complementary masks in the movable still projector and project the image of the complementary mask onto the same mosaic of the television camera, thus producing composite television pictures.

Another object of the invention is to provide a monitor showing these composite and other various effects produced on the mosaic of the single television camera.

Other special objects of the invention are to provide that all images are projected onto the same mosaic of the television camera and all in the same relationship so as to be viewed right-side-up and to read right to left.

Other important objects of the invention are to provide separate optical systems for the studio camera, the adjustable still projectors and the motion picture projectors so that all images are projected onto the same mosaic of the televesion camera in the same relationship and viewed right-side-up and reading right to left.

Another object of the invention is to provide a single television camera chain for the televising of live scenes, slides or cards and motion pictures and auxiliary objects.

Details of construction, combination and relationship of parts are set forth in the following specification and broadly covered in the claim.

The drawings accompanying and forming part of the specification illustrate certain present practical embodiments of the invention. Further changes and modifications, however, are possible, all within the true intent and broad scope of the invention as hereinafter defined and claimed.

Fig. 1 in the drawings is a diagrammatic plan view illustrating the studio camera in position for televising a live subject and projecting the image onto the mosaic of the television camera and showing two motion picture projectors positioned at opposite sides of the optical axis of the studio camera and at an angle to the mosaic of the television camera, with reflectors to project the images onto the mosaic of the television camera; also two movable still projectors in inclined relation at opposite sides of the optical axis with separate optical systems for projecting images onto the same mosaic of the television camera, and all mounted on a combined support which can be movable in respect to the television camera;

Fig. 2 is a side elevation illustrating the same parts and showing diagrammatically, in addition, connections from the television camera to the control room and the television images as viewed in a television receiver with one such receiver positioned above the television camera to serve as a monitor view finder for the projected images from the studio camera, still projectors and motion picture projectors, and to assist in maintaining correct focus of the projected images on the mosaic of the television camera, and also electrical means for controlling the light of the still projectors for effecting dissolves, fades and other results;

Figures 6, 7, 8, 9:
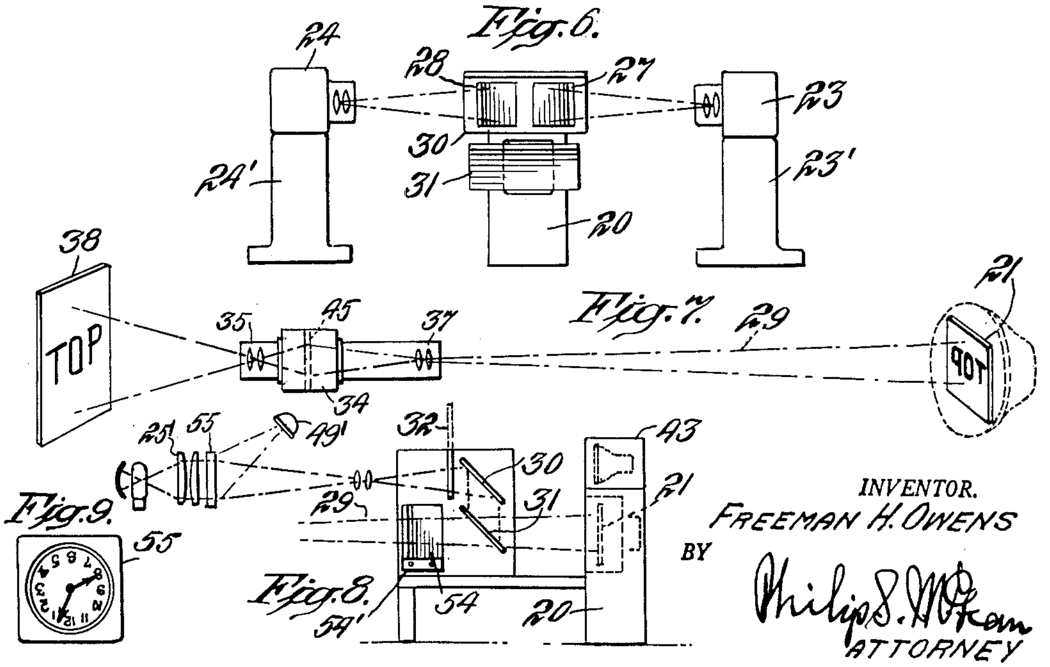
Fig. 6 is a front view looking toward the television camera and showing the two motion picture projectors with the reflector system for the projection of the motion pictures onto the mosaic of the television camera.

Fig. 7 is a diagrammatic representation of the basic optical system of the invention, showing the image of the object televised by the first lens of the studio camera, inverted at the aerial image and this inverted aerial image re-inverted by the second lens of the studio camera and projected to the mosaic of the television camera so that the image on the mosaic is right-side-up and reads right to left, to correspond to the images on the same mosaic projected from the still and motion picture projectors or other auxiliary projectors;

Fig. 8 is a diagrammatic side elevation illustrating a modification of the reflector system for the motion picture projectors, which in this instance are mounted on the level of the optical axis of the studio camera lens and in the path of the projected, re-inverted aerial image but may be removed out of the path of the projected aerial image when the studio camera is in use, and further showing an auxiliary still projector with projection lamp, reflector and condenser lens system for operation behind a transparency, and a separate light to illuminate a card or like opaque object from the front, and a separate projection lens, all mounted above the studio camera lens optical axis with reflectors to project the images onto the mosaic of the television camera, and further showing a monitor view finder mounted above the television camera.

In this view the image of a clock is being projected onto the mosaic of the television camera, this clock being shiftable to any position.

Figure 10:
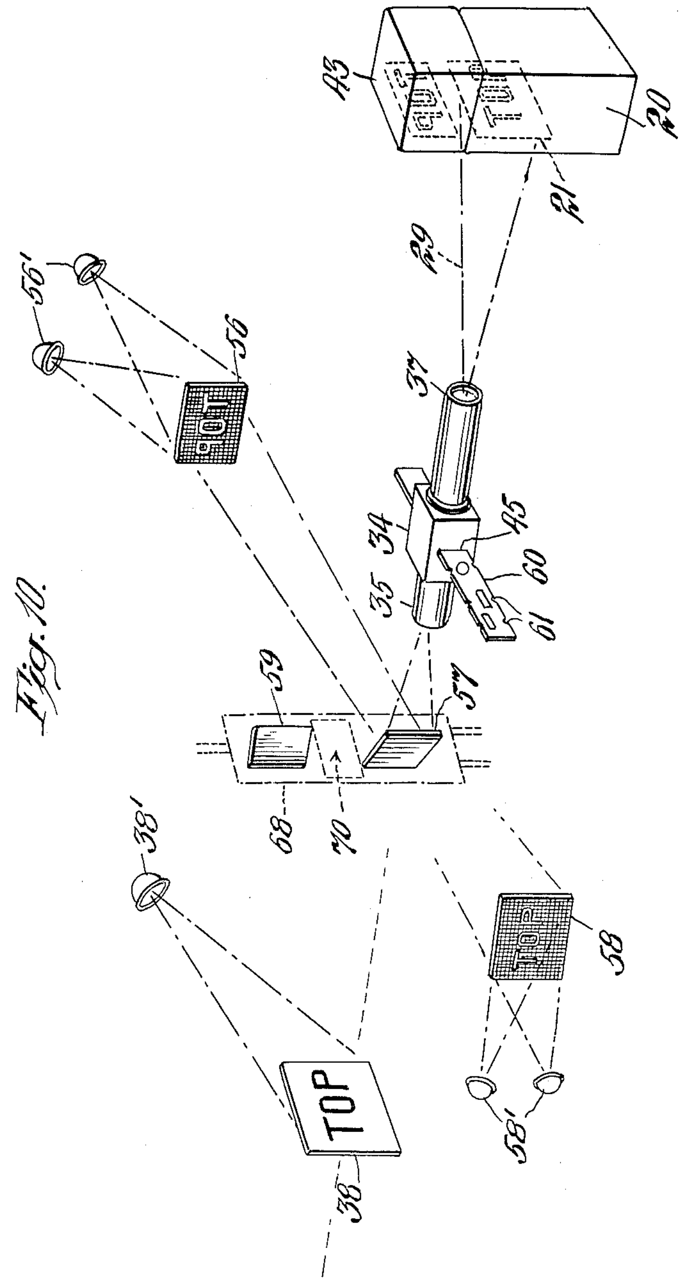
Figure 11:
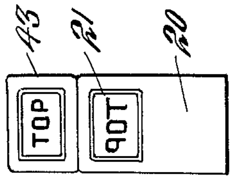
Figure 12:
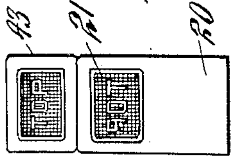
Figure 13:
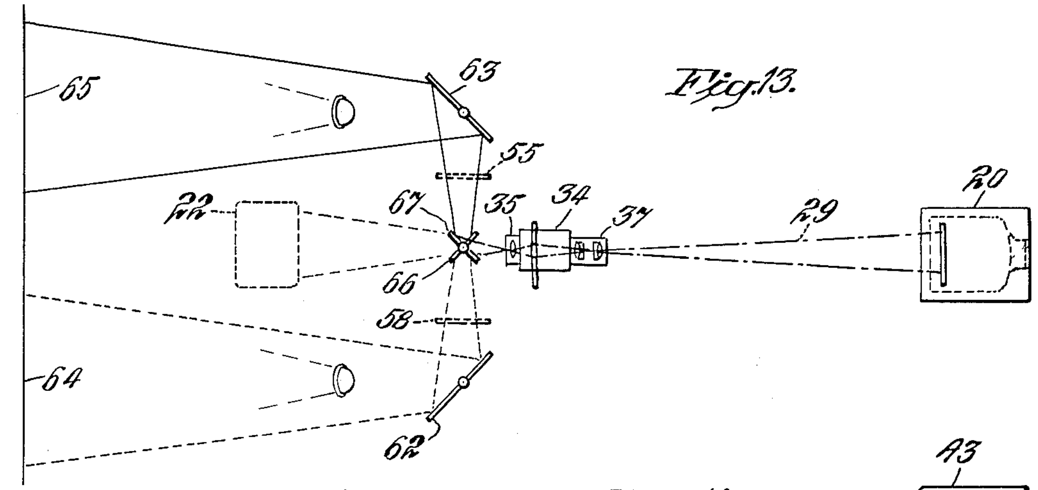
Figure 14:
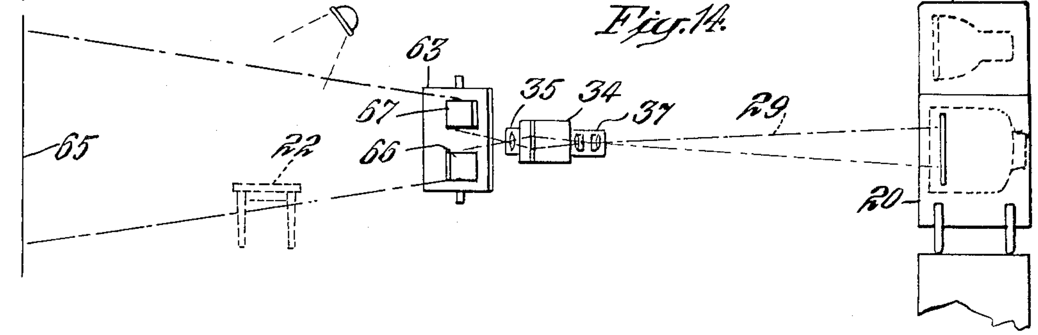
Figures 15, 16, 17:
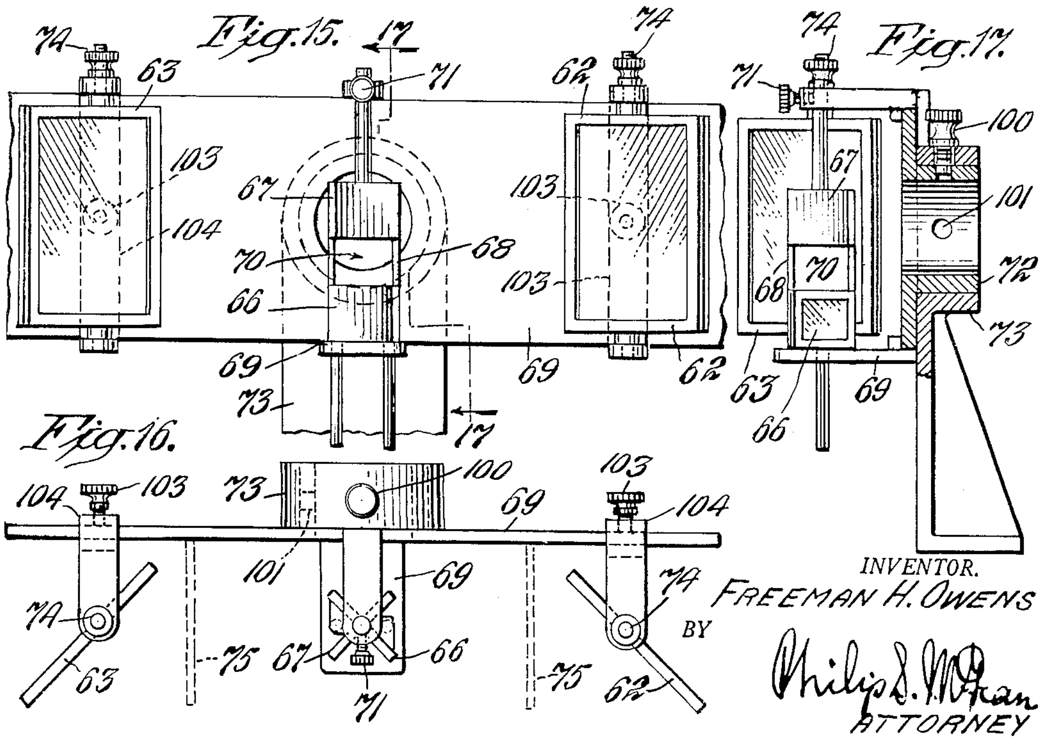
Figures 18, 19:
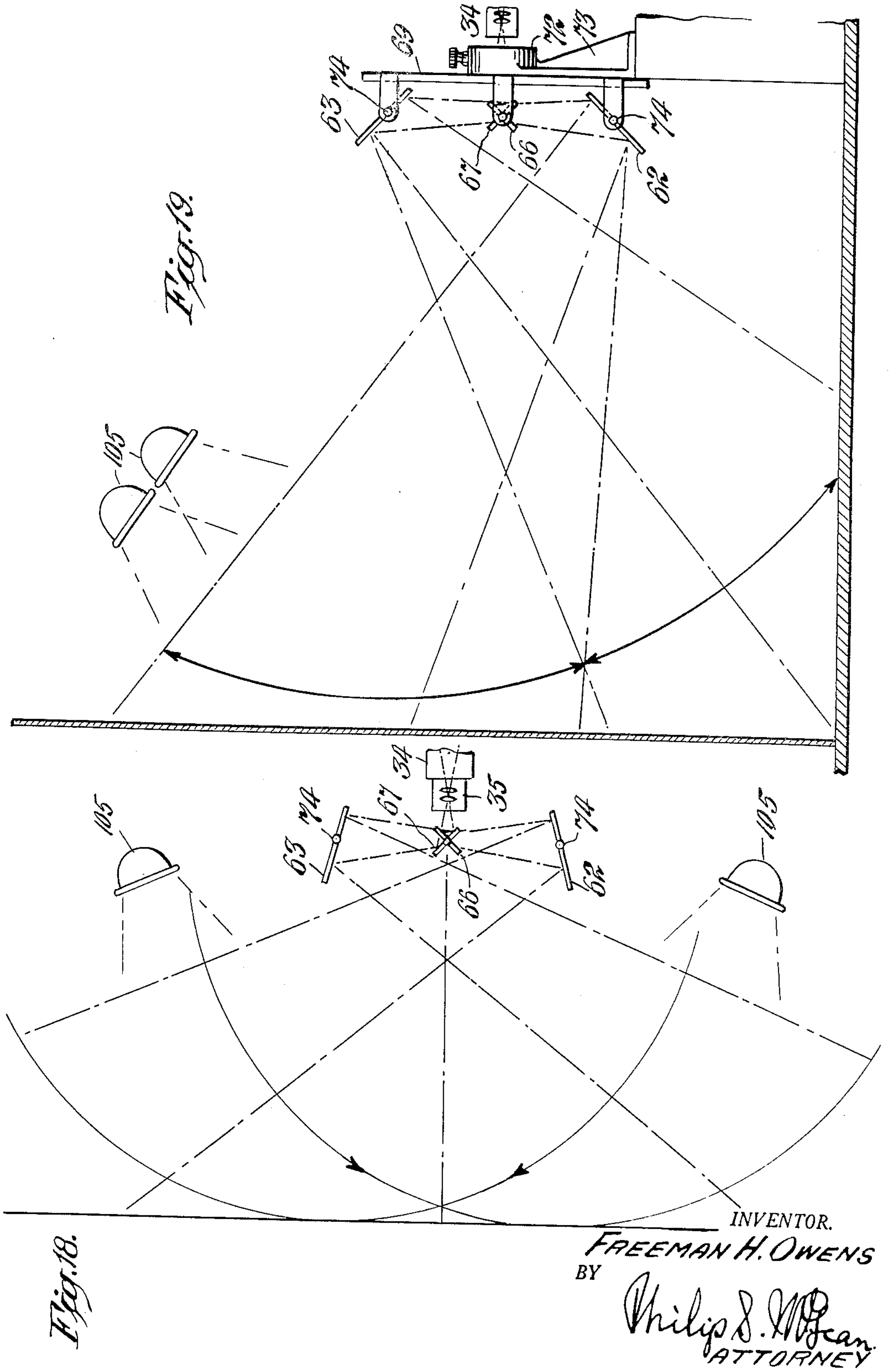
Figure 20:
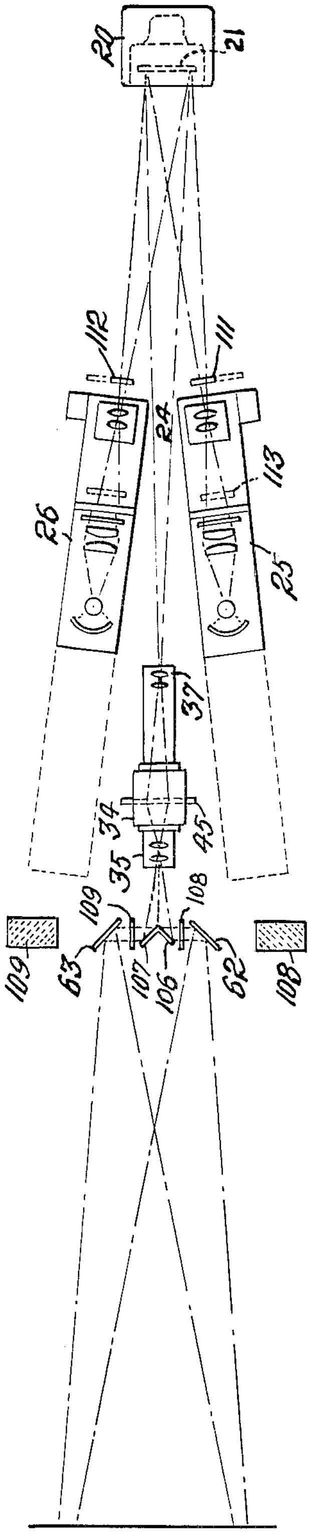
Figure 21:
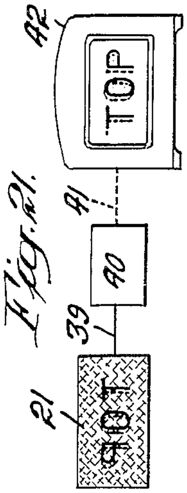
Figure 22:
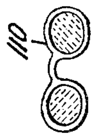

Fig. 9 is a face view of a clock placed in upsidedown position for projection onto the mosaic of the television camera. This clock may be positioned in either of the two still projectors mounted on the support so as to obtain either the same size or enlargement or reduction of the clock face;

Fig. 10 is a diagrammatic view illustrating the projection of different images from different positions in front of the studio camera onto the mosaic of the television camera and showing lighting means in front of and in the rear of the subject matter, and also showing how invisible means may be employed for writing of data such as signing a name on a letter, or writing a letter or spelling out an advertisement, means for shifting from one scene to another scene and projecting the images onto the same mosaic of the televsion camera and, further, how the scene or data projected on the mosaic of the television camera may be viewed on the monitor view finder. This view also shows the use of masks in the studio camera;

Fig. 11 is a front elevation showing how the projected image appears on the mosaic of the television camera and how it appears on the monitor view finder;

Fig. 12 is a similar view showing how the projection of the written image appears on the mosaic of the television camera and how the same image appears on the monitor view finder;

Figs. 13 and 14 are plan and side views, respectively, showing diagrammatically how two or more separate views may be televised by the studio camera through the use of a compound reflector system mounted in front of the studio camera lens and the images be projected onto the mosaic of the television camera, with a monitor view finder mounted above the television camera, and also showing the shiftable first reflectors of the compound reflector system and how cards or transparencies positioned in front of the first reflectors may be illuminated in front and from the rear, and how an object may be televised directly in front of the studio camera lens by positioning and shifting the first reflectors so as not to obstruct the path of light rays from the object in front of the studio camera lens and lighting means for the different scenes;

Fig. 15 is a broken front elevation of the first shiftable reflectors and the compound reflector system employed in Figs. 13 and 14 and means for pivotally supporting the same and for securing the shiftable first reflectors in any of three positions and for adjusting the compound reflectors and locking them in position;

Fig. 16 is a top plan view of the first reflectors, with holders for cards or slides indicated in broken lines on the pivotal support for the compound reflectors and the first shiftable reflectors;

Fig. 17 is a broken vertical sectional view of the same on substantially the plane of line 17—17 of Fig. 15, showing the pivotal support plate for the compound reflectors and the shiftable first reflectors, this view showing the open space between the top and bottom of the compound reflectors;

Fig. 18 is a diagrammatic plan view showing the shiftable first reflectors and the compound reflectors of Fig. 13 horizontally positioned for a composite, wide angle view or for making "Pans" of the subject by the studio camera lens with lamps for illuminating such scenes;

Fig. 19 is a broken part sectional view showing the shiftable first reflectors and the compound reflectors mounted in a vertical position in front of the studio camera lens for making "Tilts" of the scene;

Fig. 20 is a diagrammatic view showing in plan the apparatus modified for the showing of stereoscopic pictures, with the polarized filters required illustrated at the opposite sides of the laterally spaced reflectors;

Fig. 21 is a partially diagrammatic view showing how the laterally displaced stereoscopic images are transmitted through the control room to a television receiver;

Fig. 22 is a plan view of polarized eye-glasses used for viewing the side-by-side images presented on the screen of the television receiver.

For televising a scene with objects and the projection of data on cards and slides and the projection of motion pictures all upon the same mosaic of a single television camera, it is necessary that all the projected subject matter on the mosaic be in the same particular relationship, right-side-up and reading right to left.

Motion picture projectors and their lens systems impose a limitation in this respect, as the image is projected right-side-up and reads right to left on the mosaic.

Accordingly, it is a special feature of the present invention that the subject matter be projected onto the mosaic of the television camera in the same relationship as projected by the motion picture projectors.

In the illustration and particularly Figs. 1 through 6, a single television camera is indicated at 20, having a mosaic 21 receptive to the different subject matter projected thereon.

This television camera 20 may be mounted in fixed relation to the studio camera disposed in fixed position in front of the television camera to televise live action subjects such as indicated at 22, or to receive the pictures projected from motion picture projectors 23, 24, or to receive the projected images from the movable still projectors 25, 26, mounted on carriages positioned at opposite sides of the optical axis of the studio camera lens and at an angle to the mosaic of the television camera, or to receive the projected images from an auxiliary movable still projector.

To obtain a clear, unobstructed path for the projected light rays from the studio camera, the live action may be on a stage, at 22, the motion picture projectors 23, 24, on stands 23' and 24', be positioned in front of the mosaic of the television camera at opposite sides of the optical axis of the studio camera lens and arranged to project the images onto the mosaic of the television camera from above the optical axis by reflectors 27, 28, 30 and 31.

Figures 1, 2, 3, 4, 5:
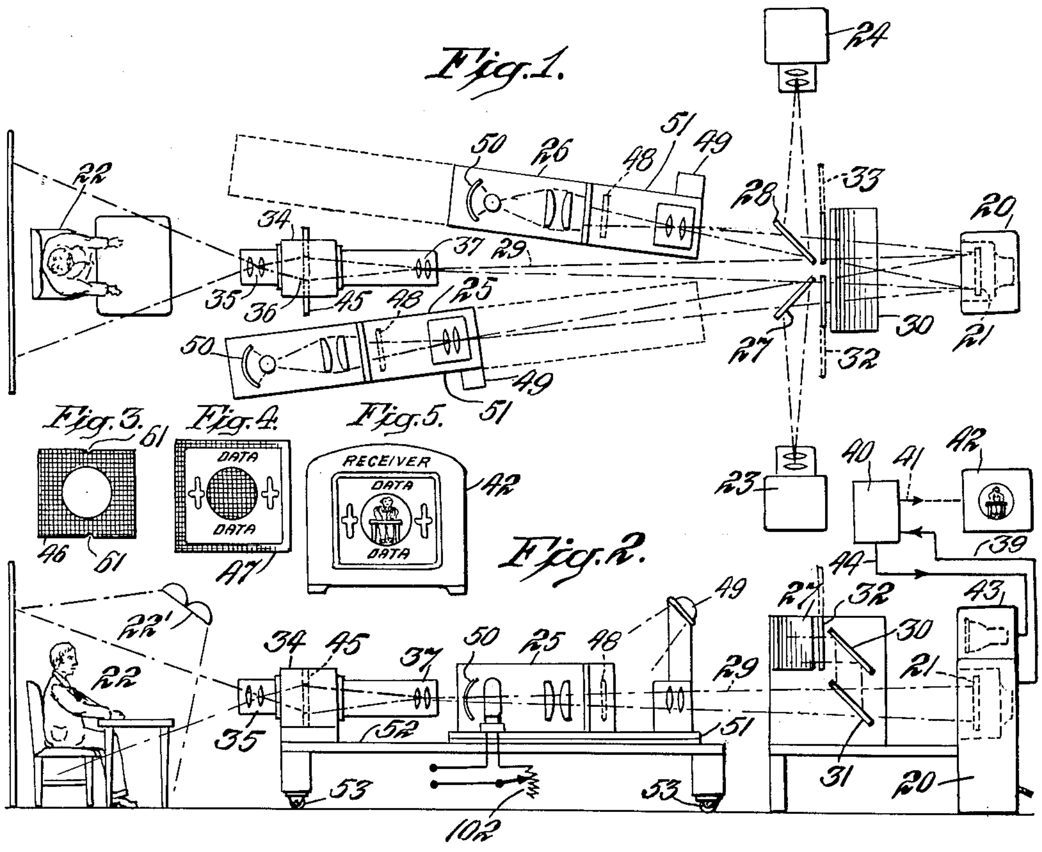
Fig. 3 is a face view of a mask used with the studio camera to block out certain area of the subject being televised.
Fig. 4 is a face view of a mask, complementary to the mask in the studio camera, to be positioned in a still projector for the projection of light through the area of the blocked out area of the studio camera mask, and also to project data on the mosaic of the television camera at the same time that the scene is being televised in the studio camera.
Fig. 5 is a face view showing the combined composite television picture appearing on the television receiver.

These reflectors are shown in Figs. 1, 2 and 6 as positioned above the optical axis 29 of the studio camera lens and the light rays reflected by the inclined reflectors 27 and 28 onto the downwardly angled reflector 30 and onto the partially silvered reflector 31 mounted in front of the mosaic of the television camera, the projected light rays from the studio camera passing through the partially silvered reflector 31 onto the mosaic of the television camera.

In this manner images from either of the motion picture projectors 23, 24, may be projected onto the mosaic of the television camera 20 without obstructing light rays projected from the studio camera of the televised subject onto the same mosaic, both projected images passing through the semi-transparent reflector 31, also the images projected from the movable still projectors 25, 26, passing through reflector 31 onto the mosaic of the television camera 20.

Shutters are indicated at 32, 33, which may be used to cut off the light rays from one projector when the other projector is in use.

The effect of the inclined reflectors 27, 28, is to reflect the projected light rays from the motion picture projectors onto the mosaic of the television camera right-side-up but to reverse the pictures right to left. All other subject matter projected onto the same mosaic of the television camera will be right-side-up reading right to left.

Accordingly, the direct action is televised by studio camera 34 located in front of the television camera 20 and between this camera and the subject 22, said studio camera 34 having a first camera lens 35 of short focal length to obtain great depth of field of the subject at the inverted aerial image 36, and a second, projection lens 37 for reinverting and projecting the aerial image right-side-up and reading right to left onto the mosaic of the television camera, the same as presented in the projection of images from the motion picture projectors 23, 24.

The studio camera can be positioned on its support to obtain the desired enlargement or reduction of the subject image and lenses of different focal length can be used and the subject 22 be illuminated by lights 22′.

The feature in this invention of the inversion of the image at the aerial focus and the re-inversion by a lens system which projects the re-inverted image onto the mosaic of the television camera in the same relation as projected by the motion picture projectors, is illustrated graphically in Fig. 7, where the subject is represented at 38. The camera lens 35 inverts the subject at the aerial focus and this aerial image is re-inverted by the lens system 37 onto the mosaic 21 of the television camera right-side-up and reading right to left. When viewed on the monitor view finder and the television receivers the image will then appear as normally viewed.

Fig. 2 shows diagrammatically how the television camera 20 may be connected at 39 with the control room 40 and how the images may be transmitted back to the monitor 43 in the operating room by wiring 44, and how these may be broadcast at 41 to the television receivers 42. The monitor view finder 43 may be used for focusing the studio camera, motion picture projectors, movable still and auxiliary projectors.

The aerial image 36 focused by lens 35 in the studio camera 34 may be shaped or outlined by masks, shutters and the like, as indicated at 45.

Masks may be employed for producing composite pictures as illustrated in Figs. 3, 4 and 5.

The first mask, 46, Fig. 3, may be inserted at 45 in the studio camera 34 and it is shown, for illustration, as having a clear central portion surrounded by a blocked-out masking area preventing light from passing through and reaching the mosaic of the television camera. This first mask may have notches as at 61 for indexing the same in the studio camera.

The second mask, 47, Fig. 4, is the opposite or companion to the mask 46, having the central area blocked out and surrounded by an unmasked portion which may carry data desired to be shown in the composite picture. When the second mask, 47, is placed in one of the movable still projectors to align it with the mask in the studio camera, a composite picture such as shown in Fig. 5 will be produced. These masks may be used to control the size and shape of the subject matter and to block the light rays of one projection system and allow the light rays of another optical system to pass, so that a combined subject may be obtained on the mosaic of the television camera.

Fig. 5 illustrates a composite result on the screen of a television receiver, showing live action televised by the studio camera at the center, surrounded by subject matter projected by the movable still projector 25 or 26.

Fig. 1 shows, at 48, the location where masks such as 47 may be positioned in the movable still projectors 25, 26, to produce a television composite picture such as illustrated in Fig. 5.

As shown in Fig. 2, the movable still projectors 25, 26, mounted on movable carriages are positioned to project the images through the lower semi-transparent reflector 31 onto the mosaic 21 of the television camera 20. Mounted on the still propector carriages are lights 49 to illuminate cards or other opaque objects in front of and in addition to the usual lamp reflector and condenser lens system positioned at the rear of the slides or transparencies, at 50.

This enables the still projectors 25, 26, to be used at different times for projection of cards, pictures, transparencies, slides and other such subject matter and either as a complete single projector or in combination with the opposite mounted duplicate, or with the studio camera for producing combined composite pictures or, by proper manipulation, for fading from one projector to the other by variable control of the lights of the projection lamps indicated at 102, or for superimposing or wipe effects, or a continuous image enlargement or reduction and various other effects.

Inasmuch as the television production is continuous as to time, the effects and projection of the different data may be produced accordingly, the apparatus being flexible so as to produce any desired data or subject matter, either singly or by two or more of the different projectors in combination.

The lenses may be adjustable for focus, and removable, and the still projectors preferably are longitudinally adjustable as a unit toward and away from the television camera, as indicated by the broken lines in Fig. 1, and the still projectors may be adjusted toward and away from the mosaic of the television camera to effect enlargement or reduction of the image. The enlargement or reduction may be accomplished during the time that the studio camera is televising a scene to produce a composite image from the studio camera and still projector.

For such purposes the base structure of the still projector carriage may be mounted for longitudinal movement on the support 52, and this support may be a table or other structure mounted on casters 53 for free movement for alignment with the television camera 20. This mobile support or table 52 also may support the studio camera 34, thus to maintain the studio camera and the still projectors at opposite sides of the studio camera and at an angle to the mosaic of the television camera.

Fig. 8 shows how the motion picture projectors 23, 24, instead of being located above the level of the optical axis as first disclosed, may be located on the same level, with reflectors in the path of the optical axis for the showing of motion pictures. This may be accomplished by supporting the angled first reflectors 54 for the motion picture projectors, corresponding in effect to the first reflectors 27, 28, Figs. 1 and 2, on movable plates 54′, corresponding to the mounting of the first reflectors 27, 28, Fig. 1, so that they may be shifted laterally out of the path of the optical axis when the studio camera is in use. The slide plates 54′ may be quickly positioned for the showing of the motion pictures. In Figs. 1 and 2 these first reflectors need not be moved, enabling composite motion pictures with a live subject to be televised.

Figs. 8 and 9 show how a clock may be mounted in position to be televised by supporting the instrument, 55, upside-down as in Fig. 9, in the projecting position at 55 in Fig. 8, in one of the still projectors 25 or 26, or in an auxiliary projector 25', illuminated by lamp 49'.

The clock may be positioned in any location on the holder and the image of the same may be reduced or enlarged so that the image of the running clock can be located at any position in the television picture.

When the clock is projected from the auxiliary projector 25', Fig. 8, the light rays are reflected by reflector 30 downwardly to semi-silvered reflector 31 onto the mosaic of the television camera, and these projected light rays on the mosaic can be combined with the projected light rays from the motion picture projectors 23, 24, and also with the projected light rays from the two still projectors 25, 26, or be combined with the subject televised by the studio camera 34.

The projection of the clock onto the mosaic of the television camera, as disclosed, does not require a specially constructed clock, as the projection of the clock in the upside-down position projects the image right-side-up and reading right to left on the mosaic of the television camera. As described before, this image is transmitted so as to be viewed correctly on the television receiver, as indicated at 42 in Fig. 5.

Fig. 10 is a diagrammatic view showing how all images from the several different sources are projected in the same relation onto the same mosaic 21 of the single television camera 20.

In this view the object, as represented by the word "TOP" on a transparency slide at 56, is being televised by way of inclined reflector 57, by the studio camera 34 and right-side-up but reversed right to left looking at the front side, but viewed from the rear side this is correct. This arrangement enables one to write normally on the rear side of a painted black glass slide to produce writing which will appear on the television receiver as a moving white line projected through the black slide, illuminated from the rear, at 56'.

When the shiftable first reflectors, 57, 59, that are mounted in front of the studio camera lens 35, are moved so that the reflector 59 is in front of the studio camera lens, in place of the reflector 57, the transparency slide 58 will be televised. This slide may be painted a black or other color that will scrape off by a sharp scriber or like implement. The line or lines of material scraped off will be televised as a white line or lines on the television receiver. This slide is illuminated from the back by lamps at 58'.

By shifting the first reflectors 57, 59, to bring the open space 70 between the reflectors in line with the object in front of the studio camera lens 35, this object, as represented by the opaque card 38, illuminated from in front as indicated at 38, will be televised and the image projected onto the mosaic 21, right-side-up but reading right to left, as before.

Masks 60 with indexing notches 61 may be positioned in the studio camera at 45 to control the shape and extent of the televised image and to produce different effects.

By use of the inclined first reflectors 57, 59, in front of the studio camera lens 35 and the inverting optical system, at 37, to project the light rays from the slides onto the mosaic of a television camera, the effect of invisible writing means is accomplished, since the hand which is doing the writing on the backs of the slides is not televised. This writing hand may be far enough back of the black painted slide so that only the scribed marks will be televised.

This action writing may be combined with the images projected from the motion picture projectors 23, 24, or be combined with images from the still projectors 25, 26, or be combined with the projected image from the auxiliary projector 25', Fig. 8, on the mosaic of the television camera.

Thus opaque objects such as 38, transparencies at 56, writings at 58, all in front of the camera lens 35 will be televised and projected by the studio camera in the same order onto the mosaic of the television camera.

Figs. 11 and 12 show how the pictured matter and writings, respectively, are projected onto the mosaic 21 of the television camera and then viewed in the proper reading relation in the monitor view finder 43.

Greater areas may be televised and "panned" or other effects produced with the form of apparatus illustrated in Figs. 13 to 19, and including inclined reflectors 62, 63, adjustably spaced laterally on opposite sides of the light beam or optical axis of the studio camera lens represented at 29. These inclined reflectors may be adjusted to televise separate views at 64, 65, Fig. 13, or laterally spaced portions of the same view may be transmitted by reflectors 62, 63, onto the inclined center reflectors 66, 67, mounted one above the other and shiftable into line with the auxiliary lens 35 of the studio camera for projection onto the mosaic of the television camera 20.

The center reflectors 66, 67, are shown carried by a frame 68, Fig. 15, slidingly guided for vertical movement in the support 69, with clear, unobstructed space 70 between the top and bottom reflectors for televising objects such as 22, Figs. 13 and 14, directly in front of the camera lens 35.

The frame 68 carrying the shiftable first reflectors 66, 67, is shown as securable by clamp screw 71. When secured in an intermediate position with the opening 70 in line with the optical axis, live action or other scenic material, at 22, may be televised. This frame carrying the reversely inclined first reflectors 66, 67, may be raised or lowered and secured in either of these positions in line, one or the other, with the laterally spaced reflectors 62, 63.

To produce "Pans" and tilt effects the outer, spaced reflectors 62, 63, may be mounted for angular or rotative adjustment as by having the support 69 rotatably engaged at 72 in a supporting standard 73. Instead of mounting this entire compound reflector system to be rotated, "Pan" and other effects may be obtained by mounting the reflectors for angular swing adjustments on supporting axes at 74, or by a combination of these various adjustments.

Fig. 16 shows how the support 69 may be used for card or slide projection purposes by mounting card or slide holders 75 on the face of the same, these card or slide holders preferably being individually removable and replaceable.

In Fig. 17 the rotatable reflector carrier or support 69 is shown as adapted to be secured in any one of several positions of rotative adjustment by a set screw 100 on the pedestal 73 engageable with indexing openings 101 in the central hub portion 72 of the support.

Clamp screws indicated at 103 in Figs. 15 and 16 may be employed to secure the brackets 104 which carry the outer reflectors 62, 63, in laterally adjusted position on the support 69.

Fig. 18 illustrates diagrammatically the "Panning" effects obtained by rotating the reflectors 62, 63, on vertical axes 74, and Fig. 19 shows how tilting effects can be obtained by rotating these reflectors 62, 63, about these same axes disposed horizontally by rotative adjustment of the support 69. As shown in these views, proper illumination of the subject or scene is provided at 105.

The studio camera 34 with the camera lens 35 inverts the image at the aerial focus and this aerial image is re-inverted by the projector lens 37 and projected onto the mosaic of the television camera in the same order or relation as effected, through the reflectors, by the motion picture projectors 23, 24, and the still and auxiliary projectors 25, 26, 25' enabling a single television camera to be used for the televising and projection of pictures and data to produce a complete television picture.

In addition to reducing costs of equipment, the less number of camera chains and the less equipment requires less space and less personnel, and all this is accomplished in the present invention, with added features of flexibility, versatility and variety in production of effects for dissolving, combining, change-over, fading and the like.

The slide holder for the still projectors 25 and 26 may be of the automatic or semi-automatic type disclosed in copending patent application Serial No. 219,680, filed April 6, 1951, so that the cards, transparencies and like subjects projected by these machines to the television camera may be automatically advanced in a desired order and each automatically focused as they are put into operative position.

The angularly adjustable, combined reflector system illustrated in Figs. 13 to 19 may be employed with and be a part of the system illustrated in Figs. 1 and 2. Figs. 13 and 14, therefore, should be considered as combining this dual reflector system with the disclosure of Fig. 1. This, as will be clear, may be effected by locating the side reflectors 62, 63, Fig. 13, at opposite sides of the camera 34 in Fig. 1.

With the combination disclosed, desired depth of picture is obtained. All the different subjects which the apparatus is capable of handling are televised to best advantage and all these desirable results are attained without changing present practice in the control room for projection of motion pictures.

To prevent interference the light beam entering the television camera may be protected by a surrounding hood or shield and other more or less usual accessories may be employed, the invention fitting in with present methods of operation.

The television camera may be similar to the RCA film camera type TK–20A, with an RCA 1850 iconoscope pickup tube and a type TM–5A camera monitor.

Fig. 20 illustrates a modification of the invention designed for the production of stereoscopic pictures by using the laterally offset, inclined reflectors 62, 63, to present the laterally offset images to reversely angled, inclined reflectors 106, 107, at the center in line with the first lens 35 of the studio camera 34.

Polarized reflectors 108, 109, between the outer and inner reflectors 62, 106, and 63, 107, cause the two images to be projected onto the mosaic 21 of the studio camera 20 in the offset relation appearing in Fig. 21, and through the control room 40 these images are telecast to appear on the receiver 42, as indicated in this view, to be seen through polarized viewing glasses such as indicated at 110, Fig. 22, as a unitary composite stereoscopic picture.

Fig. 20 also shows how the convergently inclined still projectors 25 and 26 may be used at the same time, if desired, with suitable shutters, masks or filters at 111, 112 and 113, to project related data or other illustration onto the mosiac to appear with the stereoscopic picture.

While in Fig. 21 the side-by-side images created by the stereoscopic projection are indicated in overlapping relation, it should be considered that they may be projected in a completely separated side-by-side relation.

What is claimed is:

Apparatus for televising subjects of widely different character, comprising in combination a single television camera, a projecting camera having a short focal length lens directed toward the televised subject for producing a sharp aerial image of live action and an enlarging lens directed toward the mosaic of said television camera for impressing live action on the mosaic, and still projectors at opposite sides of said projecting camera and adjustable on convergently inclined lines toward and away from the mosiac of said same television camera, said live action projecting camera and still projectors being independently controlled and adjusted for transmitting live action or different stills to said television camera in any desired succession or order and a common support for said live action projecting camera and still projectors bodily shiftable in respect to said television camera and the live action to be televised for enabling quick changes in procedure.

References Cited in the file of this patent

UNITED STATES PATENTS

| | | |
|---|---|---|
| 1,031,542 | Fielding | July 2, 1912 |
| 1,319,820 | Williams | Oct. 28, 1919 |
| 1,438,906 | Douglass | Dec. 12, 1922 |
| 1,545,674 | MacKay | July 14, 1925 |
| 1,666,304 | Proctor | Apr. 17, 1928 |
| 1,895,211 | Short | Jan. 24, 1933 |
| 1,959,498 | Planskoy | May 22, 1934 |
| 2,031,361 | Bowen | Feb. 18, 1936 |
| 2,073,370 | Goldsmith | Mar. 9, 1937 |
| 2,301,254 | Carnahan | Nov. 10, 1942 |
| 2,317,282 | Henriquez | Apr. 20, 1943 |
| 2,417,446 | Reynolds | Mar. 18, 1947 |
| 2,510,621 | De France | June 6, 1950 |
| 2,543,066 | Salinger | Feb. 27, 1951 |
| 2,553,903 | Dufour | May 22, 1951 |
| 2,566,509 | Albright | Sept. 4, 1951 |

FOREIGN PATENTS

| | | |
|---|---|---|
| 309,137 | Great Britain | Mar. 13, 1930 |
| 326,527 | Germany | Sept. 20, 1920 |
| 376,328 | Italy | Nov. 10, 1939 |

OTHER REFERENCES

"The Focusing Viewfinder Problem In Television Cameras," Beers, Proceedings of I. R. E., March 1943, pp. 100–106.

"Multiplexing Film Cameras To Minimize T. V. Program Failures," Tele-Tech, November 1947, pp. 34, 35 and 64.